United States Patent
Moinuddin et al.

(10) Patent No.: US 11,356,155 B1
(45) Date of Patent: Jun. 7, 2022

(54) METHOD OF OPTIMIZING MULTI-CELL ASSOCIATION IN DOWNLINK MULTI-USER, MULTIPLE-INPUT, MULTIPLE-OUTPUT (MU-MIMO) SYSTEMS VIA STATISTICAL BEAMFORMING

(71) Applicant: King Abdulaziz University, Jeddah (SA)

(72) Inventors: Muhammad Moinuddin, Jeddah (SA); Ubaid M. Al-Saggaf, Jeddah (SA); Ahmad Kamal Hassan, Swabi (PK)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/524,264

(22) Filed: Nov. 11, 2021

(51) Int. Cl.
- *H04B 7/0452* (2017.01)
- *H04B 7/0426* (2017.01)
- *H04B 7/08* (2006.01)

(52) U.S. Cl.
CPC ........... *H04B 7/0452* (2013.01); *H04B 7/043* (2013.01); *H04B 7/086* (2013.01)

(58) Field of Classification Search
CPC ....... H04B 7/0452; H04B 7/043; H04B 7/086
See application file for complete search history.

(56) References Cited

U.S. PATENT DOCUMENTS

| | | | |
|---|---|---|---|
| 2013/0279403 A1* | 10/2013 | Takaoka | H04B 7/024 370/328 |
| 2016/0029333 A1* | 1/2016 | Seo | H04J 11/00 370/350 |
| 2019/0090247 A1 | 3/2019 | Qvarfordt et al. | |

FOREIGN PATENT DOCUMENTS

| | | |
|---|---|---|
| CN | 111901018 A | 11/2020 |
| KR | 10-1902686 | 9/2018 |

OTHER PUBLICATIONS

Tran, et al. ; Performance Analysis of Two-Tier HetNets With Massive MIMO and Nonuniformly Small Cell Deployment; IEEE Transactions on Vehicular Technology, vol. 66, No. 11 ; Nov. 2017.

\* cited by examiner

*Primary Examiner* — Vineeta S Panwalkar
(74) *Attorney, Agent, or Firm* — Oblon, McClelland, Maier & Neustadt, L.L.P.

(57) ABSTRACT

A method is provided of optimizing multi-cell association for a downlink multi-user, multiple-input, multiple-output (MU-MIMO) system that includes a plurality of base stations corresponding to C number of cells which serve K user terminals. Each user terminal connects with at least two cells. The method includes determining which cells for each user to connect with based on minimizing an objective function that is dependent on at least weight parameters for each $k^{th}$ user connected to each $c^{th}$ cell. Based on the determination, the user terminals are connected to their respective cells and the weight parameters are applied toward a beamforming configuration for the plurality of base stations. A device is also provided having processing circuitry configured to perform the method.

19 Claims, 14 Drawing Sheets

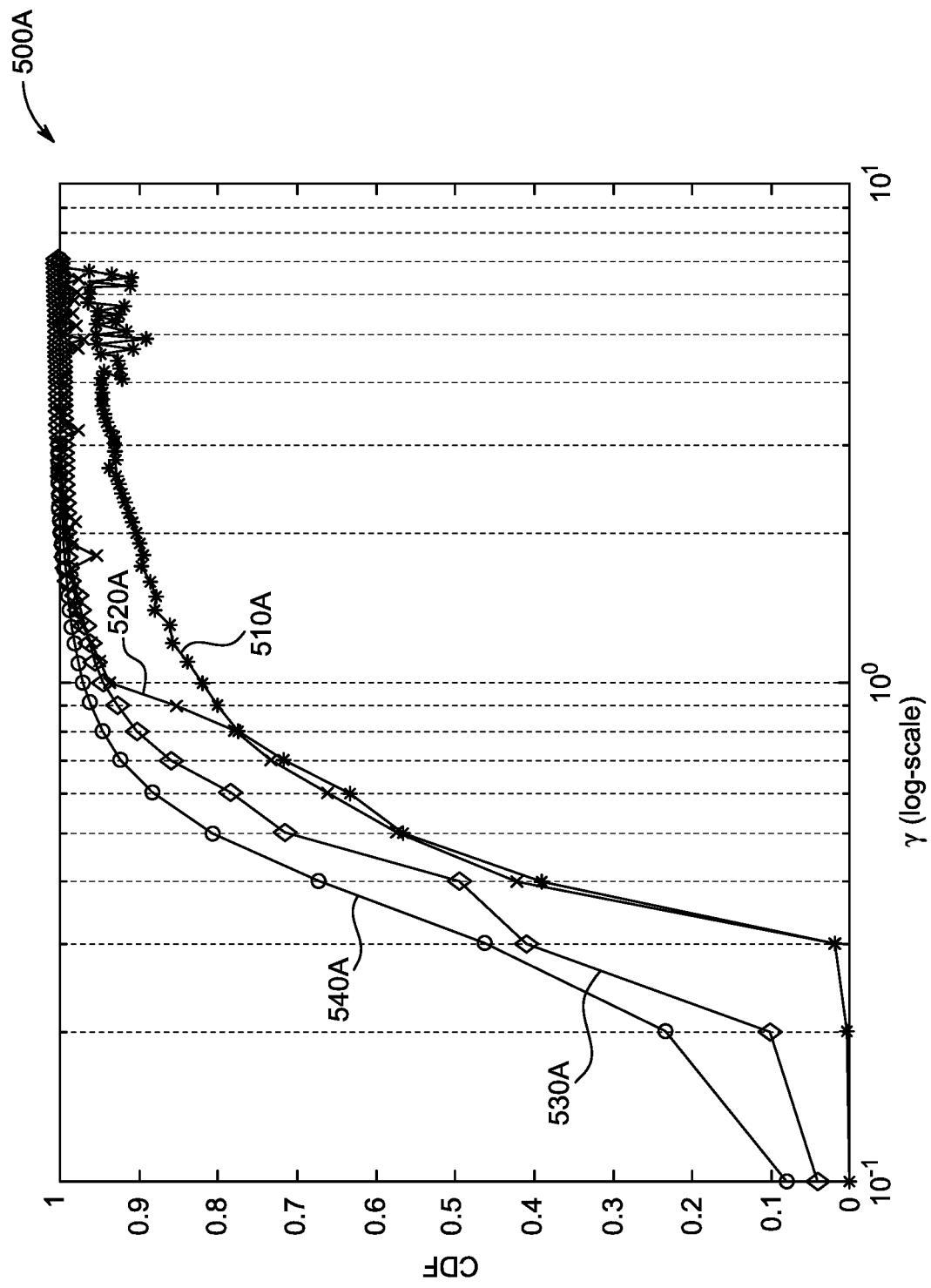

METHOD OF OPTIMIZING MULTI-CELL ASSOCIATION IN DOWNLINK MULTI-USER, MULTIPLE-INPUT, MULTIPLE-OUTPUT (MU-MIMO) SYSTEMS VIA STATISTICAL BEAMFORMING

STATEMENT OF ACKNOWLEDGEMENT

The inventors extend their appreciation to the Deputyship for Research and Innovation, Ministry of Education in Saudi Arabia for funding this research work through the project number 2020-022 and King Abdulaziz University, DSR, Jeddah, Saudi Arabia.

BACKGROUND

Technical Field

The present disclosure is directed to telecommunications systems and, more specifically, to adaptive beamforming for optimized multi-cell association in a downlink multi-user, multiple-input, multiple-output (MU-MIMO) system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Multi-tier cellular networks are addressing the challenging spectrum demands of current and future telecommunications networks. These networks typically deploy a small-cell tier and a macro-cell tier, with a number of varied deployment topologies in use. One approach in this field is operation in distinct frequency bands in the heterogeneous cellular network (HCN), i.e., the methods focus on decoupled access schemes. Other techniques rely on a selection-based mobile station (MS) association scheme in a multi-tier HCN.

For quality-of-service (QoS) purposes, a multi-order simultaneous connectivity framework has been proposed for LTE as well as for fifth generation (5G) communication systems. Under these schemes, an individual MS can be associated with multiple small and macro cells, broadly referred to as base stations (BSs) in this application, in both uplink and downlink directions. Kim and Popovski ("Reliable uplink communication through double association in wireless heterogeneous networks", 2016, IEEE Wireless Communications Letters, 5(3), pp. 312-315) researched a reliable double association in an uplink scenario. The authors theorized that both system reliability as well as user connectivity experience can be enhanced by simultaneous multi-cell association. Systems and methods for multi-cell access have been proposed in U.S. patent application Ser. No. 14/332,159, in order to realize multi-cell association. The downlink system of the '159 application coordinates multiple spatially and geographically separated transmission points to perform beamforming serving a single MS, potentially enhancing system performance in terms of the received signal quality and interference cancellation.

Lema et al. ("Flexible dual-connectivity spectrum aggregation for decoupled uplink and downlink access in 5G heterogeneous systems," 2016, IEEE Journal on Selected Areas in Communications, 34(11), pp. 2851-2865), in the context of a simultaneous multi-cell association in a downlink communication system, showed that an MS can efficiently select a set of serving BSs. Selection in that reference was based on network geometry and system configuration parameters. An investigation by Shi et al. ("Dual connectivity enabled user association approach for max-throughput in the downlink heterogeneous network," 2017, Wireless Personal Communications, 96(1), pp. 529-542) examined a hybrid association scheme with an MS operating in either single or dual connectivity mode, also in the context of downlink HCN.

Korean Patent 1902686B1 describes a 5G multiple-tier cellular network in which energy efficiency is improved, including a discussion of the influence of an SINR threshold value with respect to the coverage probability. Chinese Patent 111901018A describes a wireless backhaul method in a heterogeneous cellular network. A portion of that solution involves an SINR coverage probability of a small-cell uplink.

Zakrzewska et al. ("Dual connectivity in LTE HetNets with split control- and user-plane." In 2013 IEEE Globecom Workshops (GC Wkshps), pp. 391-396, IEEE) analyze dual connectivity in an LTE-Advanced system and make use of channel state information-reference signals (CSI-RS) for cell selection/re-selection. Wu and Qian ("Energy-efficient NOMA-enabled traffic offloading via dual-connectivity in small-cell networks," 2017, IEEE Communications Letters, 21(7), pp. 1605-1608) examined traffic scheduling aspects in yet another investigation of dual connectivity. U.S. Patent Application 2019/0090247A1 describes a control node configured to receive Channel State Information (CSI) between remote radio heads, minimizing pairwise interference leakage between RRHs in an area of interest by using the CSI. From the aspect of mathematically characterizing network KPIs, an indefinite quadratic form (IQF) approach was introduced by Al-Naffouri at al. ("On the distribution of indefinite quadratic forms in Gaussian random variables," 2015, IEEE Transactions on Communications, 64(1), pp. 153-165). Al-Naffouri's study included a cumulative distribution function (CDF), but one of instantaneous SINR metrics.

Separate from the matter of dual connectivity is beamformer design. An investigation by Bjornson et al. ("Optimal multiuser transmit beamforming: A difficult problem with a simple solution structure [lecture notes]," 2014, IEEE Signal Processing Magazine, 31(4), pp. 142-148) considers CSI availability for an optimal linear beamforming design. This approach is based on signal-to-interference-plus-noise ratio (SINR) analysis, failing to characterize the transmit beamformer through the lens of signal-to-leakage-plus-noise ratio (SLNR). An SLNR-based optimization to improve key performance indicators (KPIs) was considered in Shen et al. ("Transmitter optimization for per-antenna power constrained multi-antenna downlinks: An SLNR maximization methodology," 2016, IEEE Transactions on Signal Processing, 64(10), pp. 2712-2725), but for single-association contexts.

The effectiveness of how and when to reduce leakage of a neighbouring cell, in the context of signal-to-leakage-plus-noise ratio (SLNR) based model and methods, is addressed in U.S. Pat. No. 8,768,261. The SLNR expressions are in a quadratic form, helpful for the characterization of performance metrics, in the same reference. Another non-patent reference to Tran and Teh ("Performance Analysis of Two-Tier HetNets With Massive MIMO and Nonuniformly Small Cell Deployment," 2017, IEEE Transactions on Vehicular Technology (Volume: 66, Issue: 11, Nov. 2017) describes outage-constrained robust multigroup multicast beamforming for multi-beam satellite communication systems with full frequency reuse.

Each of the aforementioned approaches suffers from one or more drawbacks hindering their adoption, such as failing to address methods of obtaining closed-form expressions of system metrics or properly considering beamformer design. Utilization of joint outage/leakage approaches for improving performance is completely absent in the above references. Use of spectrally efficient statistical CSI rather than bandwidth-intensive instantaneous CSI is also generally not considered. Accordingly, it is one object of the present disclosure to provide methods and systems for optimizing multi-cell (MU) association in downlink MU-multiple-input and multiple-output (MIMO) systems to overcome these drawbacks.

SUMMARY

In an exemplary embodiment, a method of optimizing multi-cell association in a downlink multi-user, multiple-input, multiple-output (MU-MIMO) system includes a plurality of base stations corresponding to C number of cells, which serve K user terminals. Each user terminal connects with at least two cells. The method includes determining which cells for each user to connect with. The determination is based on minimizing an objective function that is dependent on at least weight parameters for each $k^{th}$ user connected to each $c^{th}$ cell. Based on the determination, the method further includes connecting the user terminals to their respective cells and applying the weight parameters toward a beamforming configuration for the plurality of base stations in the system.

In some embodiments, the objective function is based on obtaining a coverage probability $\overline{O}_k(\gamma)$ for a user k using a first function and obtaining a leakage metric $L_k(\gamma)$ using a second function. The coverage probability defines the user k simultaneously being associated with the C number of cells. The leakage metric $L_k(\gamma)$ is for multi-cell association for the kth user associated with the C number of cells. In certain embodiments, the first function is related to an eigenvalue of a Hermitian matrix and a threshold level of the $c^{th}$ cell. In embodiments, the second function is related to a threshold level of the $c^{th}$ cell.

In some embodiments, the objective function relies on adaptive weight vectors and a weight vector. In certain embodiments, the objection function is a sum of weight parameters pertinent for the kth user connected to the $c^{th}$ cell. In embodiments, constraints applied to the objective function normalize the power parameters as fixed per cell. The constraints also ensure that the outage probability for each cell-user pair at the time index t+1 does not exceed its previous value.

In another exemplary embodiment, a device for optimizing multi-cell association in a downlink multi-user, multiple-input, multiple-output (MU-MIMO) system that includes a plurality of base stations corresponding to C number of cells which serve K user terminals. Each user terminal connects with at least two cells. The device includes processing circuitry configured to determine which cells for each user to connect with, based on minimizing an objective function. The objective function is dependent on at least weight parameters for each kth user connected to each $c^{th}$ cell. The processing circuitry is further configured to connect the user terminals to their respective cells and applying the weight parameters toward a beamforming configuration for the plurality of base stations, based on the determination.

In another exemplary embodiment, a non-transitory computer readable medium having instructions stored therein that, when executed by one or more processors, cause the one or more processors to perform a method of optimizing multi-cell association in a downlink multi-user, multiple-input, multiple-output (MU-MIMO) system. The system includes a plurality of base stations corresponding to C number of cells, which serve K user terminals. Each user terminal connects with at least two cells. The method that is executed includes determining which cells for each user to connect with based on minimizing an objective function that is dependent on at least weight parameters for each kth user connected to each cth cell. The method also includes connecting the user terminals to their respective cells and applying the weight parameters toward a beamforming configuration for the plurality of base stations based on the determination.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 5A is a graph of a cumulative distribution function versus signal-to-interference-plus-noise ratio (SINR) when using various algorithms, according to certain embodiments.

DETAILED DESCRIPTION

Figure 1:
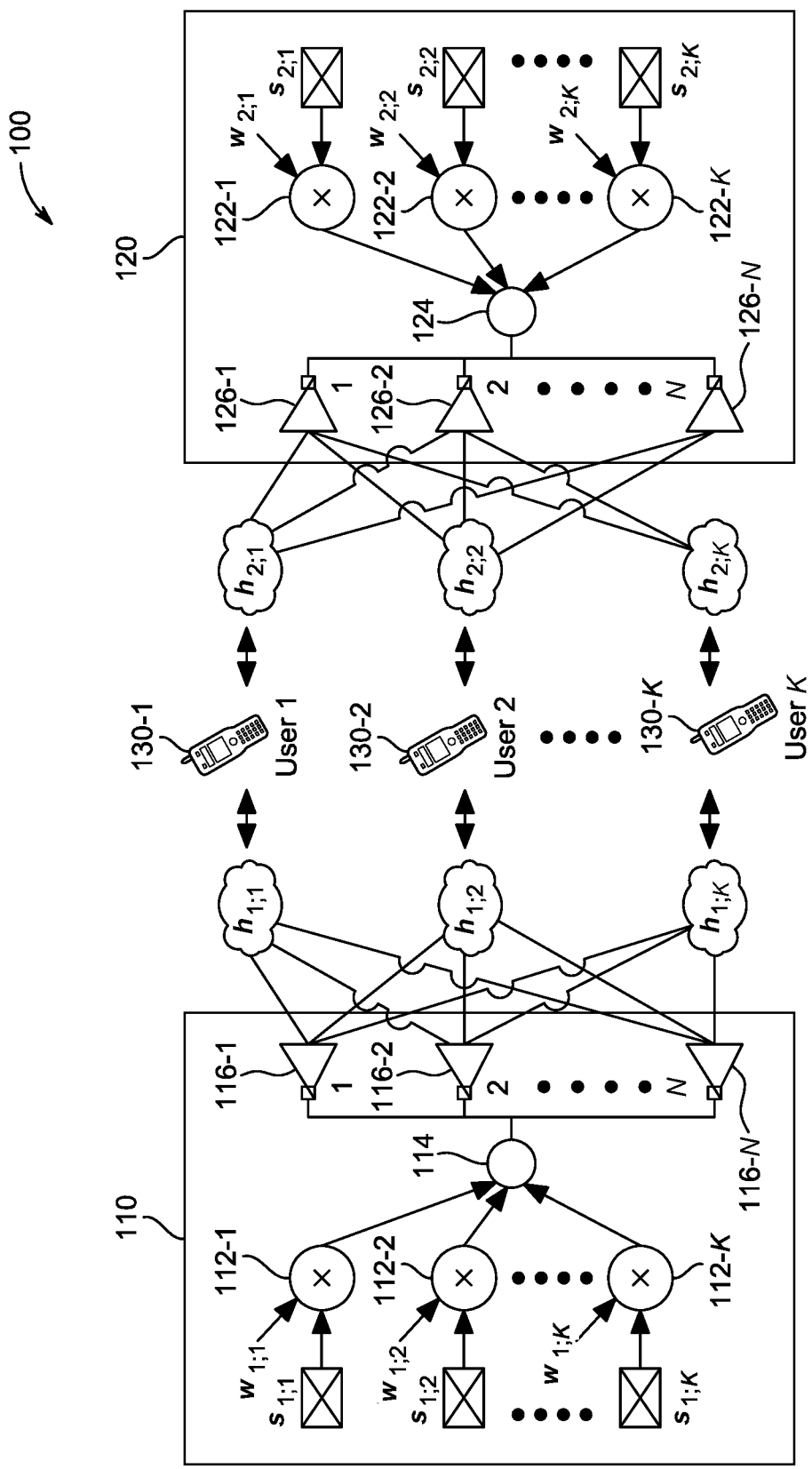
FIG. 1 is a schematic diagram of a system for optimizing multi-cell association in a downlink multi-user, multiple-input, multiple-output (MU-MIMO) system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

According to embodiments of the present disclosure, methods are provided for improving the probability of coverage in a network by ensuring reliable base station and mobile user connectivity through means of spatial transmit beamforming schemes. The solutions described above and below are bandwidth efficient, as they do not require transmitting or receiving pilot signals (i.e., for estimation of instantaneous CSI). The disclosed methods make use of statistical channel station information (CSI), which reduces the computational resources employed due to the relatively simpler estimation methods.

In addition, more precise closed-form expressions of key performance indicators (KPIs) are derived. These key performance indicators include parameters such as the signal-to-interference-plus-noise ratio (SINR) and the signal-to-leakage-plus-noise ratio (SLNR) distributions for multi-cell association in a downlink multi-user, multiple-input, multiple-output (MU-MIMO) system. The closed-form expressions are derived through assumptions of statistical CSI, available and realizable at the transmitter side. The derived metrics are also helpful in understanding and modeling the behavior of the overall MU-MIMO system with respect to several (dependent and independent) variables.

Outage-based and leakage-based optimization problems are employed to implement a blind transmit beamformer design. Accordingly, the above-mentioned closed-form expressions derived for the performance metrics are used in that process. Moreover, the above and below described solutions have a great deal of flexibility in terms of sub-routines and algorithms available with which to realize the beamformer design.

In results discussed below, merits of multi-cell association in the MU-MIMO system are shown, even by employing random beamforming vectors obtained from Gaussian codebooks. Furthermore, coverage probability can be increased by incorporating multi-objective coverage maximization problems in the presence of constraints regarding user-centric QoS and normalized transmit beamformers. According to embodiments of the present disclosure, optimization is performed at the BS level having high computational power, without burdening the battery and processing-power-limited MS.

Turning now to the attached drawings, FIG. 1 is a schematic diagram of a system 100 for optimizing multi-cell association in a downlink multi-user, multiple-input, multiple-output (MU-MIMO) system, according to certain embodiments. System 100 includes a first base station (BS) 110 and a second base station 120. System 100 also includes a plurality of K single-antenna user devices (mobile stations or MS), numbered from 130-1 to 130-K shown within the service area of both base stations as illustrated by their communication with both BS 110 and BS 120. BS 110 and BS 120 can be assumed from different cells in the following description, although the specific service areas or cells are not illustrated in the present application.

The base stations shown in FIG. 1 are for illustrative purposes only and only portions of the components included in the described base stations are depicted. However, the proposed methods are available for multiple cells, for multi-tiered systems having overlapping cell coverage (i.e., macro-cell and small-cell deployment), or a combination of the two frameworks. As an example, users 130 can connect with a macro cell and a small cell, such as a picocell or a femtocell. In some instances, users 130 can connect with more than one macro cell and/or more than one small cell concurrently. More generally speaking, any MS within the system can connect with C number of cells (i.e., base stations or BSs) simultaneously.

Once again described generically, the $k^{th}$ user in system 100 can connect with the $c^{th}$ cell (where $c \in \{1, 2, \ldots, C\}$). As shown in FIG. 1, data symbols $s_{c;k}$ are multiplied by beamformer weight vectors $w_{c;k}$ at multipliers 112-1 through 112-K and 122-1 through 122-K. Data symbols $s_{c;k}$ are of length N×1. Once multiplied, the data symbols are added by an adder 114 (in BS 110) or an adder 124 (in BS 120). Before or after either of those two operations, any other appropriate pre-processing of the symbols at the BS can be performed by one or more controllers (not numbered or shown). Once fully processed, the symbols are then transmitted. BS 110 transmits symbols through antennas 116-1 through 116-N. BS 120 transmits symbols via antennas 126-1 through 126-N. The normalization of each symbol is considered as $E|s_{c;i}|^2=1$, for $i=\{1, \ldots, K\}$.

Continuing with FIG. 1, a downlink scenario is depicted where one or more of the MSs (130-1 through 130-K) is double-associated, or connected with both BS 110 and BS 120. Again, the double-associated example is for illustration only, and multi-cell association of more than two cells is possible for a single user. The mathematical representation for a received signal for the $k^{th}$ user specifically connected with the $c^{th}$ cell, denoted by $y_{c;k}$, is given by Equation 1 below.

$$y_{c;k} = h_{c;k}^H w_{c;k} s_{c;k} + \sum_{i=1, i=k}^{K} h_{c;k}^H w_{c;i} s_{c;i} + v_{c;k} \quad (1)$$

As shown in Equation 1 above (and illustrated in FIG. 1), $h_{c;k}$ represents the $c^{th}$ independent N×1 zero-mean complex circular Gaussian channel with covariance matrix $R_{c;k}$, i.e., $h_{c;k} \sim CN(0, R_{c;k})$. The first term in Equation 1 indicates the desired signal (i.e., the legitimate signal for the user). The second term represents the co-channel interference (CCI) experienced by the $k^{th}$ user within system 100, while the third term ($v_{c;k}$) is additive white noise with zero-mean and variance $\sigma_{c;k}^2$.

The mathematical principles and assumptions underlying system 100 will now be discussed in detail. What follows will outline more precise closed-form expressions for the cumulative density function of the SINR, i.e., the outage probability for all combinations of k denoted as $O_k(\gamma)$, $\forall \{k\}$, according to some embodiments. The following will also characterize the distribution of SLNR, represented as $L_k(\gamma)$, $\forall k$. Accordingly, for downlink multi-cell association system 100, the minimization problem shown in Equation 2 below will be solved.

$$\{O_k(\gamma) \cup L_k(\gamma)\}, \forall \{c, k\},$$

$$\|w_{c;k}\|_2^2 = 1, \forall \{c, k\}, \quad (2)$$

In this expression, U represents selection of SINR and/or SLNR-based optimization, while the constraint is put in place to limit the power of all beamformers based on the power constraint(s) of the base station.

For the problem outlined in Equation 2 above, exact closed-form expressions may be defined for the cumulative distribution function of both SINR and SLNR. One means of achieving this is an indefinite quadratic formulation (IQF), according to some embodiments of the present disclosure. The use of an IQF, in turn, creates a case for deriving a canonical quadratic formulation. Outlined below are calculations to achieve the canonical quadratic forms of SINR and SLNR, further (mathematical) definitions of coverage probability, and brief discussions regarding methods of the channel transformations, according to some embodiments. Once derived, the resulting expressions can then be used to generate transmit beamformer designs, according to embodiments.

First turning to an interference-based canonical IQF formulation, the coverage probability can be defined as the probability by which a given user (or an average fraction of users) can achieve a specified SINR threshold or target. In other words, coverage probability can be considered as the complementary cumulative distribution function (CCDF) of the SINR. The mirror image to the coverage probability is the cumulative distribution function (CDF) of the SINR, more commonly referred as the outage probability for a given user in the system.

Using a unitary association formulation, the instantaneous SINR for the $k^{th}$ user connected with the $c^{th}$ cell can be represented as shown in Equation 3 below. In the second portion/line of the equality, $SINR_{c;k}$ can be expressed using the whitened version of $$h_{c;k}, \text{ i.e., } \overline{h}_{c;k} = R_{c;k}^{-\frac{H}{2}} h_{c;k}.$$

In the third line/portion of Equation 3, a quadratic form-based representation is given. The weight matrices of the desired signal term and the co-channel interference (CCI) term, denoted by $A_c$ and $B_c$ respectively, are given by Equations 4 and 5 below.

$$SINR_{c;k} = \frac{|h_{c;k}^H w_{c;k}|^2}{\sigma_{c;k}^2 + \sum_{i=1,i\neq k}^{K} |h_{c;k}^H w_{c;i}|^2} \qquad (3)$$

$$= \frac{\overline{h}_{c;k}^H R_{c;k}^{\frac{1}{2}} w_{c;k} w_{c;k}^H R_{c;k}^{\frac{H}{2}} \overline{h}_{c;k}}{\sigma_{c;k}^2 + \sum_{i=1,i\neq k}^{K} \overline{h}_{c;k}^H R_{c;k}^{\frac{1}{2}} w_{c;i} w_{c;i}^H R_{c;k}^{\frac{H}{2}} \overline{h}_{c;k}}$$

$$= \frac{\|\overline{h}_{c;k}\|_{A_C}^2}{\sigma_{c;k}^2 + \|\overline{h}_{c;k}\|_{B_C}^2}$$

$$A_C = R_{c;k}^{\frac{1}{2}} w_{c;k} w_{c;k}^H R_{c;k}^{\frac{H}{2}} \qquad (4)$$

$$B_C = R_{c;k}^{\frac{1}{2}} \left( \sum_{i=1,i\neq k}^{K} w_{c;i} w_{c;i}^H \right) R_{c;k}^{\frac{H}{2}} \qquad (5)$$

The outage probability of the $k^{th}$ user associated with C number of cells can be denoted as $O_k(\gamma)$. In this notation, the outage probability is a parameter for a specified threshold level of the $c^{th}$ cell denoted as $\gamma_c$. Conversely, the CCDF representing the probability of coverage for the $k^{th}$ user connected simultaneously with C cells is denoted as $\overline{O}_k(\gamma)$. Based on Eq. 3, the coverage probability has the form shown in Equation 6 below. The second representation/equality in Equation 6 holds true based on the condition of independence across associated links.

$$\overline{O}_k(\gamma) = 1 - Pr(SINR_{1;k} < \gamma_1; \ldots; SINR_{c;k} < \gamma_c) = 1 - \Pi_{c=1}^C Pr(SINR_{c;k} < \gamma_c) \qquad (6)$$

The outage probability for the individual user-cell pair where the $k^{th}$ user is connected with the $c^{th}$ cell, denoted as $F_{c;k}(\gamma_c)$, can be represented as shown below in Equation 7.

$$F_{c;k}(\gamma_c) = Pr(SINR_{c;k} < \gamma_c) = Pr(\alpha_{c;k}^2 \gamma_c + \|\overline{h}_{c;k}\|_{-P_c}^2 > 0) \qquad (7)$$

In this representation, $P_c$ is a Hermitian matrix. The matrix can be expressed by the equation $P_c = A_c - \gamma_c B_c$, where $A_c$ and $B_c$ are given in Equations 4 and 5, respectively, as shown above.

In contrast to the interference-based SINR metric described above, which is based on interference or a given user receiving an unwanted signal from the other users, the leakage-based SLNR metric is concerned with the opposite phenomenon. The SLNR metric centers around the unwanted projection of a given user's signal power onto the other users. In a leakage-based canonical IQF formulation, the instantaneous SLNR for the $k^{th}$ user connected with the $c^{th}$ cell is formulated as represented in Equation 8 below. The second portion of the equality in Equation 8 arises from the channel transformation. The weight matrices of the desired signal and co-channel interference (CCI) terms $\overline{A}_{c;k}$ and $\overline{B}_{c;i}$, respectively, are formulated as shown in Equations 9 and 10 below.

$$SLNR_{c;k} = \frac{|h_{c;k}^H w_{c;k}|^2}{\sigma_{c;k}^2 + \sum_{i=1,i\neq k}^{K} |h_{c;i}^H w_{c;k}|^2} \qquad (8)$$

$$= \frac{\|\overline{h}_{c;k}\|_{\overline{A}_C}^2}{\sigma_{c;k}^2 \sum_{i=1,i\neq k}^{K} \|\overline{h}_{c;i}\|_{\overline{B}_{c;i}}^2}$$

$$\overline{A}_{c;k} = R_{c;k}^{\frac{1}{2}} w_{c;k} w_{c;k}^H R_{c;k}^{\frac{H}{2}} \qquad (9)$$

$$\overline{B}_{c;i} = R_{c;i}^{\frac{1}{2}} w_{c;k} w_{c;k}^H R_{c;i}^{\frac{H}{2}} \qquad (10)$$

A leakage metric for multi-cell association in terms of the cumulative distribution function of SLNR for the $k^{th}$ user associated with C number of cells, denoted as $L_k(\gamma)$, can be represented as shown in Equation 11 below. The second equality again stems from the independence across associated links.

$$L_k(\gamma) = Pr(SLNR_{1;k} < \gamma_1; \ldots; SLNR_{c;k} < \gamma_C) = \Pi_{c=1}^C Pr(SLNR_{c;k} < \gamma_c) \qquad (11)$$

Returning to an individual user-cell pair, the cumulative distribution function of SLNR is given by the expressions shown in Equation 12. A sum of indefinite quadratic forms is denoted as $z_K$, which can be represented by Equation 13 below.

$$G_{c;k}(\gamma_c) = Pr(SLNR_{c;k} < \gamma_c) = Pr(\sigma_{c;k}^2 \gamma_c + z_K > 0) \qquad (12)$$

$$z_K = \|\overline{h}_{c;k}\|_{-A_{c;k}}^2 + \Sigma_{i=1,i\neq k}^K \|\overline{h}_{c;i}\|_{\gamma_c B_{c;i}}^2 \qquad (13)$$

Without loss of generality, an equivalent formulation of channel vectors can be used as shown in Equation 14 below. In this context, $h \sim CN(0, R)$ is the composite channel, and $R = E(h^H h)$ is the inter-channel correlation matrix.

$$\bar{h} = [\bar{h}_{c;1}, \bar{h}_{c;2}, \ldots \bar{h}_{c;k} \ldots \bar{h}_{c;K-1}, \bar{h}_{c;K}] \quad (14)$$

The composite channel transformation is performed next, i.e., $\tilde{h} = R^{H/2} h$. Given both this transformation and representing $z_k = \|\tilde{h}\|_{Q_c}^2$, Equation 12 can be simplified as Equation 15 shown below.

$$G_{c;k}(\gamma_c) = Pr(\sigma_{c;k}^2 \gamma_c + \|\tilde{h}\|_{Q_c}^2 > 0) \quad (15)$$

The variable $Q_c$ in Equation 15 is the following block-diagonal matrix.

$$Q_c = R^{\frac{1}{2}} \begin{bmatrix} -\gamma_c \bar{B}_{c;1} & 0 & 0 & \ldots & 0 \\ 0 & \ddots & 0 & \ldots & 0 \\ 0 & 0 & +\bar{A}_{c;k} & 0 & \vdots \\ \vdots & \vdots & 0 & \ddots & 0 \\ 0 & 0 & \ldots & 0 & -\gamma_c \bar{B}_{c;K} \end{bmatrix} R^{\frac{H}{2}} \quad (16)$$

Based on these mathematical manipulations, the formulations in Equations 7 and 15 are thus in a form from which an indefinite quadratic formulation can be employed to achieve a more precise closed-form expression, according to some embodiments. Conceptually speaking, these closed-form expressions may serve as the objective function for the generic problem posed in Equation 2. The constrained optimization problem in Equation 2 can be solved either by a multi-objective optimization process, or by a transformation of the multi-objective problem into a single-objective optimization problem, in some embodiments.

Despite the ability of genetic algorithm (GA) based routines to achieve the multi-objective optimization, the present application discusses linear-scalarization (LS) approaches to achieve a single-objective function, according to various embodiments. As a result, Pareto optimal solutions are tracked for each objective function. This selection is based on performance gains that can be achieved at a reduced computational cost.

Building on the exact closed-form expressions for Equations 7 and 15, several transmit beamforming designs are outlined throughout the description below, according to some embodiments. Equation 7 is in a canonical structure germane to the selected IQF approach for characterizing the coverage probability. A Fourier transform representation of a unit step function (.) is used to start the IQF approach. A next step of simplification by partial fraction expansion follows, which depends on the structure of eigenvalues of $P_c$. Lastly, through the application of residue theory, a closed-form solution can be presented in Equation 17 for the outage probability of the $k^{th}$ user connected with the $c^{th}$ cell in MU-MIMO downlink. In this expression, $\lambda_{c;n}$ represents the $n^{th}$ eigenvalue of $P_c$. The eigenvalues are functions of $\gamma_c$, which are stacked in a descending order. In other words, $\lambda_{c;i} \geq \lambda_{c;i+1}$ for all values of i. The notation $N_+$ indicates the total number of positive eigenvalues of $P_c$, rather than a specific, positively signed value.

$$F_{c;k}(\gamma_c) = 1 - \sum_{n=1}^{N_+} \frac{\lambda_{c;n}^{N-1}}{\prod_{i=1, i \neq n}^{N} (\lambda_{c;n} - \lambda_{c;i})} e^{-\frac{\sigma_{c;k}^2 \gamma_c}{\lambda_{c;n}}} \quad (17)$$

By entering Equation 17 into previously described Equation 6, the closed-form solution for the complementary cumulative distributive function can be obtained. This CCDF, shown in Equation 18 below, represents the coverage probability of the $k^{th}$ user simultaneously associated with C cells.

$$\overline{O}_k(\gamma) = 1 - \Pi_{c=1}^{C} F_{c;k}(\gamma_c) \quad (18)$$

According to some embodiments, the IQF approach from Equation 15 can be leveraged to characterize a leakage distribution in a suitable form. The closed-form solution for the cumulative distribution function of leakage metric of a $k^{th}$ user associated with the $c^{th}$ cell in MU-MIMO downlink is given in Equation 19 below. In this expression, $\lambda_{c;m}$ represents the $m^{th}$ eigenvalue of $Q_c$. The eigenvalues are again functions of $\gamma_c$, and are stacked in a descending order. The notation $M_+$ in Equation 19 represents the total number of positive eigenvalues of $Q_c$ rather than a positive sign associated with a specific number.

$$G_{c;k}(\gamma_c) = 1 - \sum_{m=1}^{M_+} \frac{\lambda_{c;m}^{M-1}}{\prod_{i=1, i \neq m}^{m} (\lambda_{c;m} - \lambda_{c;i})} e^{-\frac{\sigma_{c;k}^2 \gamma_c}{\lambda_{c;m}}} \quad (19)$$

Equation 20 below can be derived by plugging Equation 19 as outlined above into previously described Equation 11.

$$L_k(\gamma) = \Pi_{c=1}^{C} L_{c;k}(\gamma_c) \quad (20)$$

According to some embodiments of the present disclosure, several variants of adaptive beamforming design are possible in light of the available closed-form expressions of the coverage probability and the cumulative distribution function of SLNR. Several blind transmit beamforming approaches can be employed to improve the coverage probability of every association of every user, thereby improving service for the cell-user pairs. In pursuing this outcome, all objective functions are transformed to an LS-based single objective function, according to some embodiments. Various embodiments concerning specific optimization problems are outlined below, which all fall under the general heading of adaptive beamforming design.

According to some embodiments, an Outage based Distinct Association Beamformer (ODAB) design can be implemented. Equation 17 disclosed above is used to define the objective function for each user and each independent cell association in a linear scalarization form, as shown below in Equation 21. The cost function is shown below in Equation 22. In the cost function, $\zeta_c$, represents the weight parameters pertinent for the $k^{th}$ user connected to the $c^{th}$ cell.

$$\min_{w_{c;k}} \quad J_{ODAB} \quad (21)$$

$$\text{s.t.} \quad \|w_{c;k}\|_2^2 = 1;$$

$$\sum_{c=1}^{C} \sum_{k=1}^{K} \zeta_{c;k} = 1, \quad \forall c, k,$$

$$F_{c;k}^{t+1}(w_{c;k}, \gamma_c) \leq F_{c;k}^{t}(w_{c;k}, \gamma_c); \quad \forall c, k,$$

$$J_{ODAB} = \sum_{c=1}^{C} \sum_{k=1}^{K} \zeta_{c;k} F_{c;k}(w_{c;k}, \gamma_c) \quad (22)$$

In Equation 21, the first constraint ensures fixed power consumption at each cell. The second constraint serves to avoid QoS bias to users. The second constraint is based on the LS parameter with a fixed value of $$\frac{1}{CK}$$

for each of the objective functions. The third constraint indicates that the outage probability for each cell-user pair at the time index t+1 should not exceed its previous value.

According to some embodiments, the numeric value of $F_{c;k}(w_{c;k}, \gamma_c)$ is stored in a database at each iteration of the algorithm. The current value is compared with the previous value in the constraint block. There are C×K inequality constraints which are solved using the Karush Kuhn Tucker (KKT) methodology. The KKT approach provides both a local solution to the LS problem as well as local Pareto solutions to the individual objective functions. Embodiments of the ODAB design are explained in more detail in conjunction with FIG. 2.

According to some embodiments, the simultaneous association-based results derived in Equations 18 and 20 above can be applied to optimization problems as seen below. An Outage based Simultaneous Association Beamformer (OSAB) design can be implemented according to some embodiments of the present application. In this method, an objective function based on a linear scalarized sum of outage probabilities is minimized. Beam power is constrained to unity and the QoS levels are fairly provided to all users. These conditions are shown in Equation 23 below.

$$\min_{w_{c;k}, \zeta_k} \quad J_{OSAB} = \sum_{k=1}^{K} \zeta_k O_k(w_{c;k} \gamma_c) \quad (23)$$

$$\|w_{c;k}\|_2^2 = 1; \quad \forall c, k,$$

$$\text{s.t} \quad \sum_{k=1}^{K} \zeta_k = 1$$

$$F_{c;k}^{t+1}(w_{c;k}, \gamma_c) \le F_{c;k}^{t}(w_{c;k}, \gamma_c); \quad \forall c, k,$$

According to some embodiments, a Leakage based Simultaneous Association Beamformer (LSAB) design can be employed. In this technique, an objective function based on a linear scalarized sum of leakage probabilities is minimized. Once again beam power is constrained to unity, while a fair QoS is provided to all users. These conditions are shown in Equation 24 below.

$$\min_{w_{c;k}} \quad J_{LSAB} = \sum_{k=1}^{K} \zeta_k L_k(w_{c;k} \gamma_c) \quad (24)$$

$$\text{s.t.} \quad \|w_{c;k}\|_2^2 = 1; \quad \forall c, k,$$

$$\sum_{k=1}^{K} \zeta_k = 1$$

$$F_{c;k}^{t+1}(w_{c;k}, \gamma_c) \le F_{c;k}^{t}(w_{c;k}, \gamma_c); \quad \forall c, k,$$

In both of the above-described designs, the total number of objective functions equal the number of users, i.e., K. Additionally, there exist C×K inequality constraints which, according to some embodiments, are solved using KKT. There is one additional equality constraint (i.e., (C×K)+1). The additional constraint is used to avoid user bias, while the C×K equality constraints improve QoS (without increasing transmit power).

In attempt to leverage the advantages inherent in both of the above techniques, a Joint Outage and Leakage based Simultaneous Association Beamformer (JOLSAB) design may be implemented according to some embodiments. The JOLSAB design deals with the LS approach using both Equation 18 and 20 from above. The JOLSAB technique includes formulating a single objective optimization problem defined as shown in Equation 25, while the objective function is given by Equation 26, found below. In both equations, $\zeta_{1,k}$ and $\zeta_{2,k}$ represent the adaptive weight parameters of the SINR and SLNR metrics, respectively.

$$\min_{w_{c;k}} \quad J_{JOLSAB} = \sum_{k=1}^{K} \zeta_k L_k(w_{c;k} \gamma_c) \quad (25)$$

$$\text{s.t.} \quad \|w_{c;k}\|_2^2 = 1; \quad \forall c, k,$$

$$\sum_{k=1}^{K} (\zeta_{1,k} + \zeta_{2,k}) = 1$$

$$F_{c;k}^{t+1}(w_{c;k}, \gamma_c) \le F_{c;k}^{t}(w_{c;k}, \gamma_c); \quad \forall c, k,$$

$$J_{JOLSAB} = \sum_{k=1}^{K} (\zeta_{1,k} O_k(w_{c;k}, \gamma_c) + \zeta_{2,k} L_k(w_{c;k}, \gamma_c)) \quad (26)$$

According to some embodiments, object bias for one metric can be set without violating the second constraint in Equation 25. As might be surmised, when using a JOLSAB approach, the number of objective functions is doubled as compared to the "individual" approaches of OSAB and LSAB. Despite the increased complexity from the twofold computational load, the constraint functions are similar.

Figure 2:
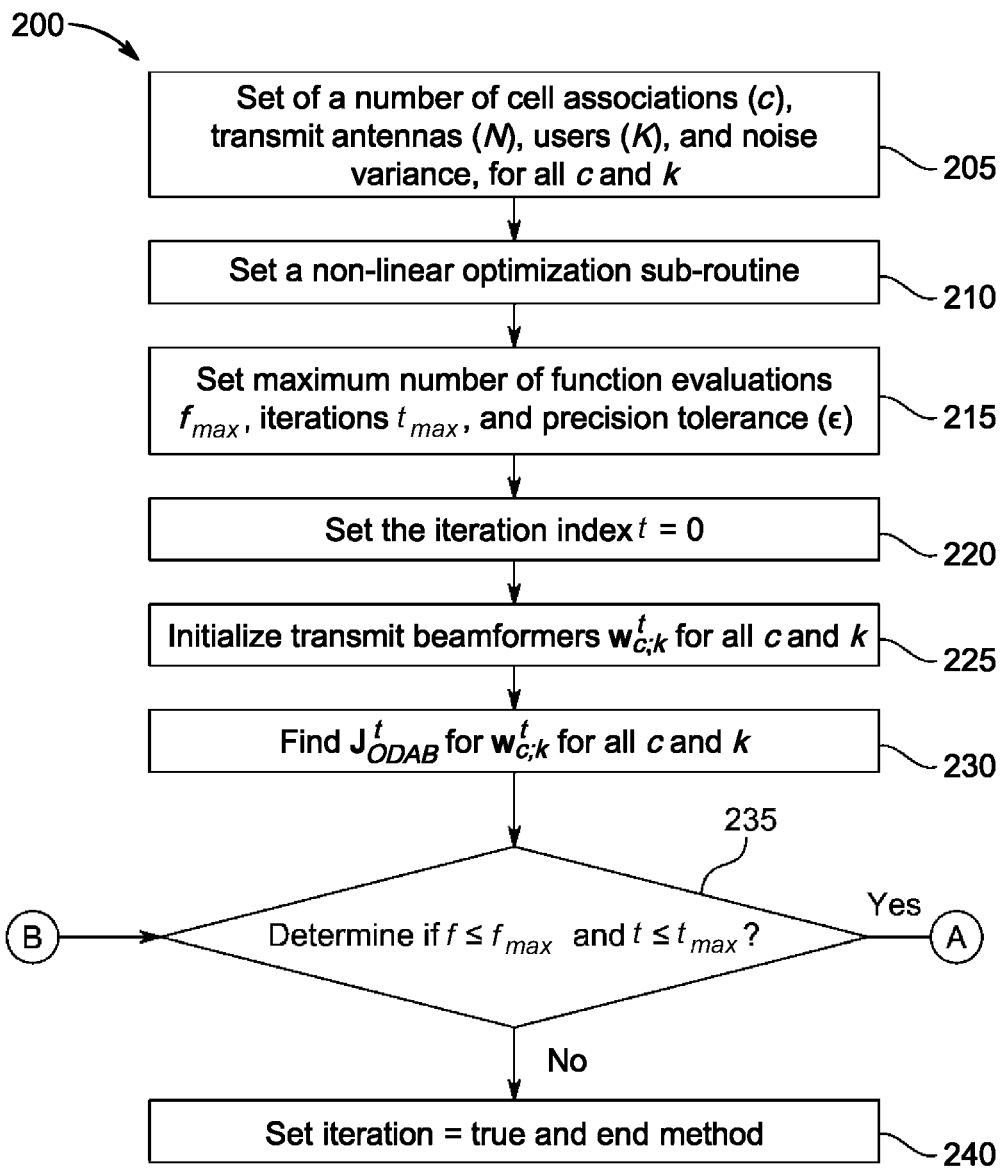
FIG. 2 is a flowchart representing a method of outage based distinct association beamformer (ODAB) design, according to certain embodiments.
Figure 2:
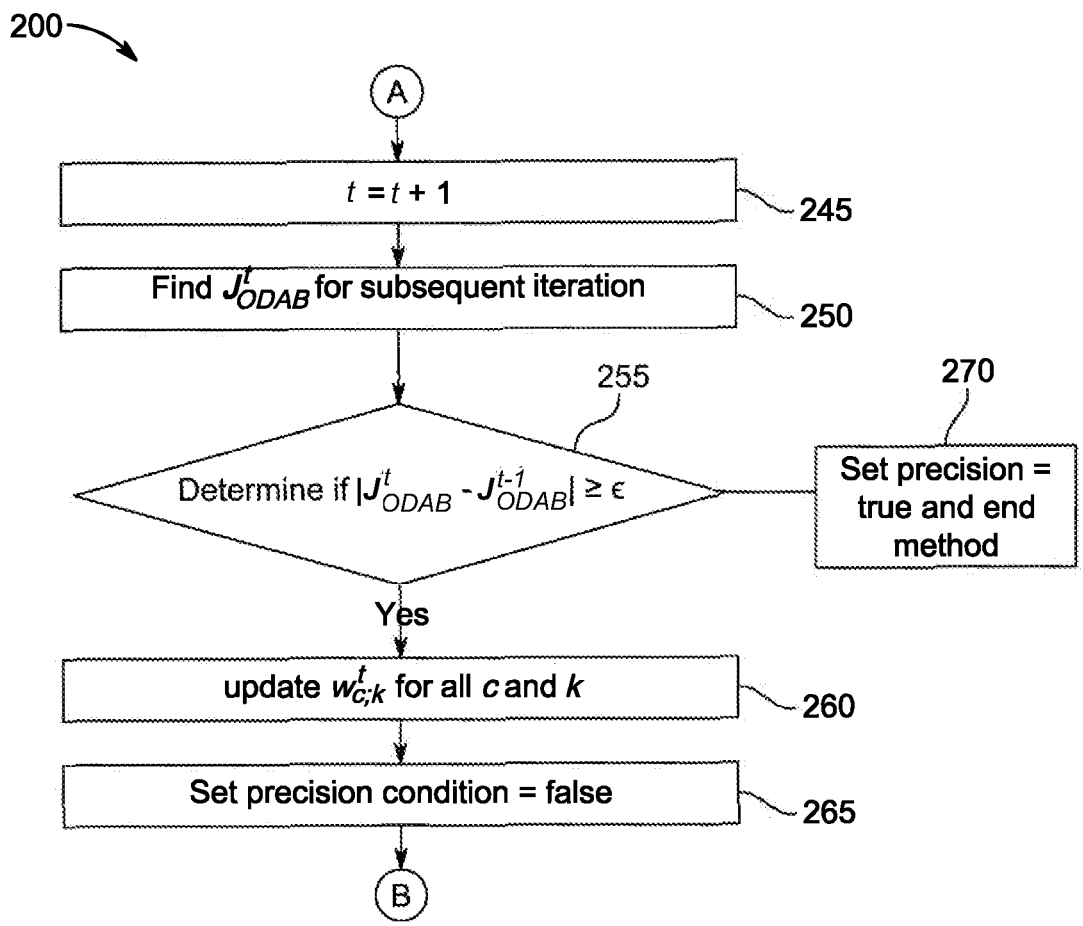

FIG. 2 is a flowchart representing a method 200 of an outage based distinct association beamformer (ODAB) design, according to certain embodiments. Method 200 can be implemented in a downlink MU-MIMO system, such as system 100 described above. For example, a controller of BS 110 or controller of BS 120 can execute some or all of method 200 in certain embodiments.

Method 200 begins with a series of parameter and algorithm selections in opening steps. At a step 205, a number of cell associations (c), transmit antennas (N), users (K), and noise variance are set, for all combinations of c and k. At a step 210, a non-linear optimization sub-routine is set. For example, one of an interior point, active-set, or sequential quadratic programming (SQP) routine can be selected, although method 200 is not so limited by these exemplary choices. A maximum number of function evaluations $f_{max}$, maximum number of iterations $t_{max}$, and a precision tolerance ($\epsilon$) are set at a step 215.

At a next stage of method 200, an initialization stage occurs. At a step 220, an iteration index is initialized, i.e., the iteration index is set to t=0. At a step 225, transmit beamformers (denoted as $w_{c;k}^{t}$) are initialized for all values of c and k. Subsequently, the function $J_{ODAB}^{t}$ is found for $w_{c;k}^{t}$, for all values of c and k, at a step 230.

One of two decision points in method 200 is encountered after all selections and initialization. At a step 235, it is determined whether both the number of function evaluations is less than a maximum (i.e., is $f \le f_{max}$) and the number of iterations is less than a maximum (i.e., is $t \le t_{max}$). If either of these conditions is not satisfied, then an iteration condition is set to true and method 200 ends at a step 240.

If both conditions in step 235 are satisfied, method 200 continues. At a step 245, the iteration index is incremented by one, i.e., t=t+1. At a step 250, the value for the subsequent/incremented iteration of $J_{ODAB}^t$ is calculated (i.e., for the new value of t).

At a step 255 a second decision point is reached. At this stage of method 200 the precision threshold is tested, i.e., it is determined whether or not $|J_{ODAB}^t - J_{ODAB}^{t-1}| \geq \epsilon$. If the determination at step 255 is yes, at a step 260 $w_{c;k}^t$ is updated for all values of c and k. At a step 265, a precision condition to set to false and the method returns to step 235. If the determination at step 255 is no, then a precision condition is set to true at a step 270 and the method ends.

As described above, method 200 sets and initializes all parameters. Method 200 then iterates for values of $J_{ODAB}^t$ until a maximum number of function evaluations is reached, a maximum number of iterations is reached, or particular precision threshold is met. The constraints also ensure that the subsequent probability is no worse than a previous value. While the above method has been described in a particular order, one of skill in the relevant arts will appreciate that certain steps may be performed in a different order without departing from the scope of the present disclosure. For example, selection and initialization of various algorithms, parameters and values may be performed in a different order. In some alternative embodiments, the steps may be combined, sub-divided, or some elements mixed and matched consistent with the overall approach and outcomes of method 200.

In the following descriptions and associated figures, derived results are validated by means of Monte Carlo simulations. Variations within the proposed blind beamforming techniques are also evaluated to determine strengths of certain methods or approaches. Distinct transmit correlation matrices are assumed for each user and each association. Cell-user associations are considered as a function of a correlation coefficient $\rho_{c;k}$, such that $R_{c;k\{i,j\}} = \rho_{c;k}^{|i-j|}$ and $0 < \rho_{c;k} < 1$, •c. The parameters used for simulations include a noise variance $\sigma_{c;k} = 10$ dBm, transmit antenna N=8, and 10,000 Monte Carlo trials. The beamforming vectors $w_{c;k}$ are initialized from a Gaussian codebook.

Figure 3:
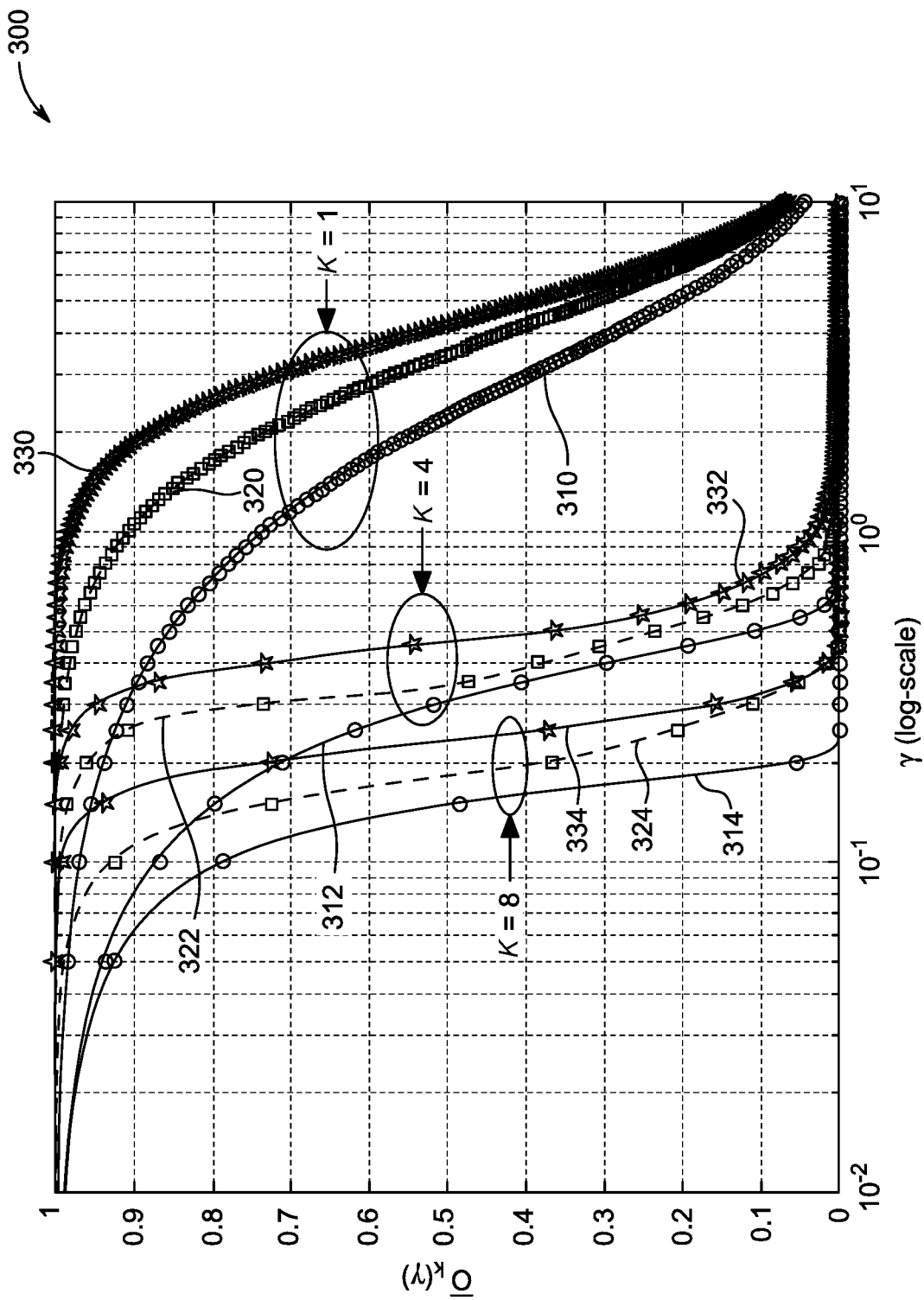
FIG. 3 is a graph of coverage probability as a function of cell associations and number of users, according to certain embodiments.

FIG. 3 is a graph 300 of coverage probability as a function of cell associations and number of users, according to certain embodiments. Broadly speaking, graph 300 shows the effects of multi-cell association on the coverage probability (given above in Equation 18) against the predefined threshold γ. Simulation results show the quality of service (QoS) of successful downlink transmission increases as the number of cell-associations increase. Multi-cell association also outperforms single-cell association across the γ range regardless of the number of users.

For example, in graph 300, single-user simulation results are plotted with curves 310, 320 and 330 for 1, 2, and 4 associations, respectively. While the outage probability drops at lower thresholds for a single cell association (i.e., C=1 as shown in curve 310), the steeper drop seen in curve 330 between threshold values of 1 and 10 shows a more impactful change when associations are more numerous, in this case for C=4.

In examples with more users, the same phenomenon occurs, but at lower threshold values of γ. For instance, graph 300 depicts similar curves for four users in curves 312, 322, and 332, again at C equal to 1, 2, and 4, respectively. In these simulations, the difference is a drop in outage probability below γ values of 1. For more users, e.g., K=8, the γ values dropped further still as shown in curves 314, 324, and 334.

Figure 4:
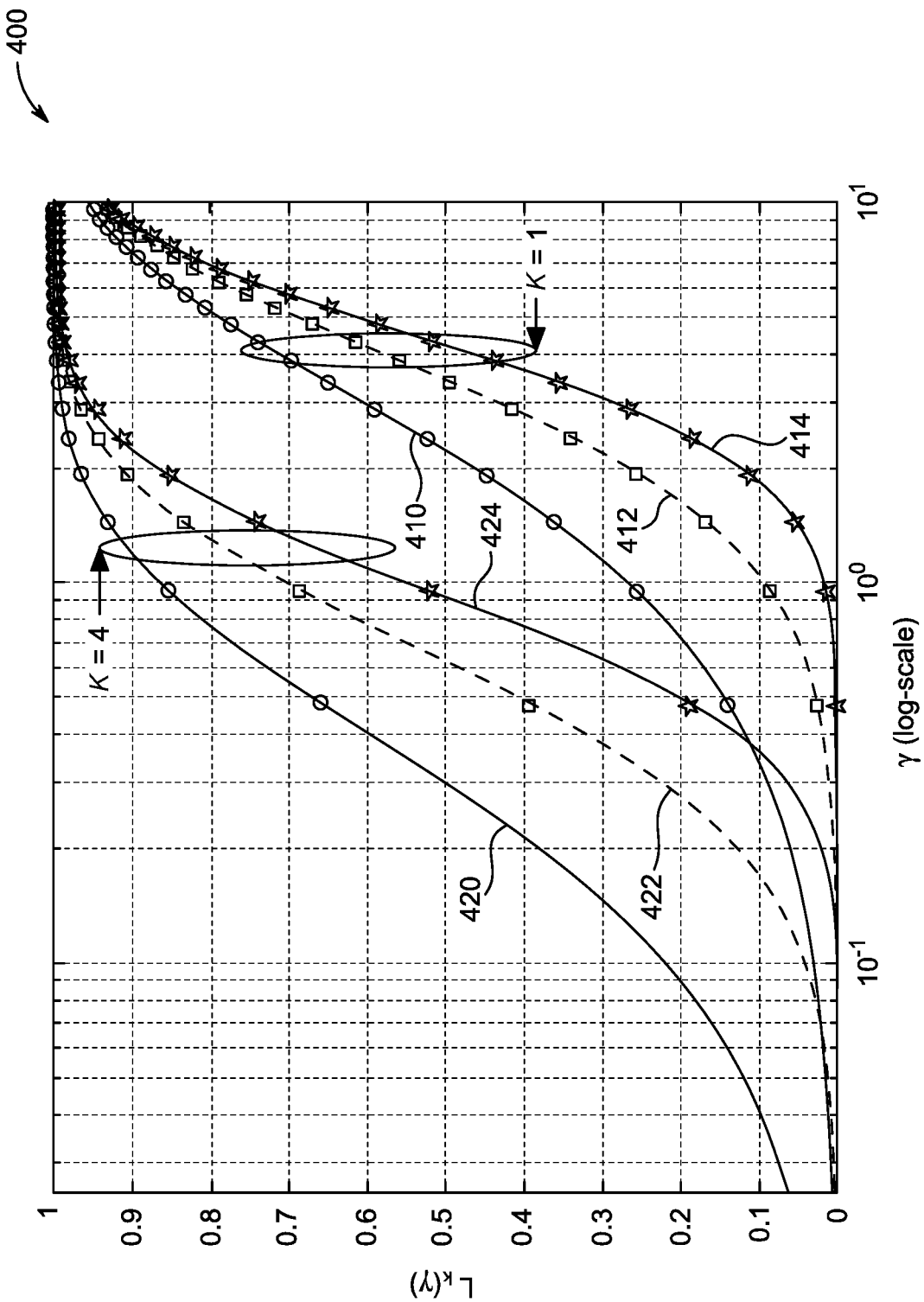
FIG. 4 is a graph of a leakage metric as a function of cell associations and number of users, according to certain embodiments.

FIG. 4 is a graph 400 of a leakage metric as a function of cell associations and number of users, according to certain embodiments. Utilizing the above-described Equation 18, simulations were performed with respect to the leakage metric in various combinations of cell associations and numbers of system users. Not only did values improve as cell associations increased, but both graph 400 and graph 300 indicate that Monte Carlo simulation results agree with the analytical values obtained in Equations 18 and 20.

FIG. 5A is a graph 500A of a cumulative distribution function versus signal-to-interference-plus-noise ratio (SINR) when using various algorithms, according to certain embodiments. In the simulations and graphs that follow, the various parameters were set to fixed values (N=4, K=4, and C=2). Embodiments of the proposed algorithms discussed above were tested by using the previously mentioned optimizations routines. Specifically, a constrained minimization function was used in conjunction with interior-point, sequential quadratic programming (SQP), and active-set methods. The maximum number of iterations and function evaluations (denoted as $t_{max}$ and $f_{max}$, discussed in further detail above with respect to FIG. 2) were set to 3000 and 10000, respectively, for each method. The real part and the imaginary part of beam vectors were segregated to form an array of 2×N×K×C optimization variables. Additionally, optimization is performed at each value for γ. Due to the non-smooth nature of objective functions, the algorithms provide local minima/maxima.

As seen in graph 500A of FIG. 5A, the results of an ODAB algorithm using interior-point, SQP, and active-set methods are shown. The local convergence of each method under similar computing constraints was also measured. The outage minimization across the γ range for an active-set algorithm, shown in curve 510A, is improved when compared to the SQP and interior-point algorithm values seen in curves 520A and 530A, respectively. All of the algorithms also outperformed an objective function as shown by curve 540A.

The tradeoff in the superior results for the active set algorithm (curve 510A) is the local convergence time of 5388 seconds, or nearly 90 minutes. Local convergence is achieved after 3256 seconds (~54 minutes) and 184 seconds (~3 minutes) for curves 520A and 530A, respectively. Thus, the interior-point method while not as successful does exhibit a great computational/timing benefit.

Figure 5B:
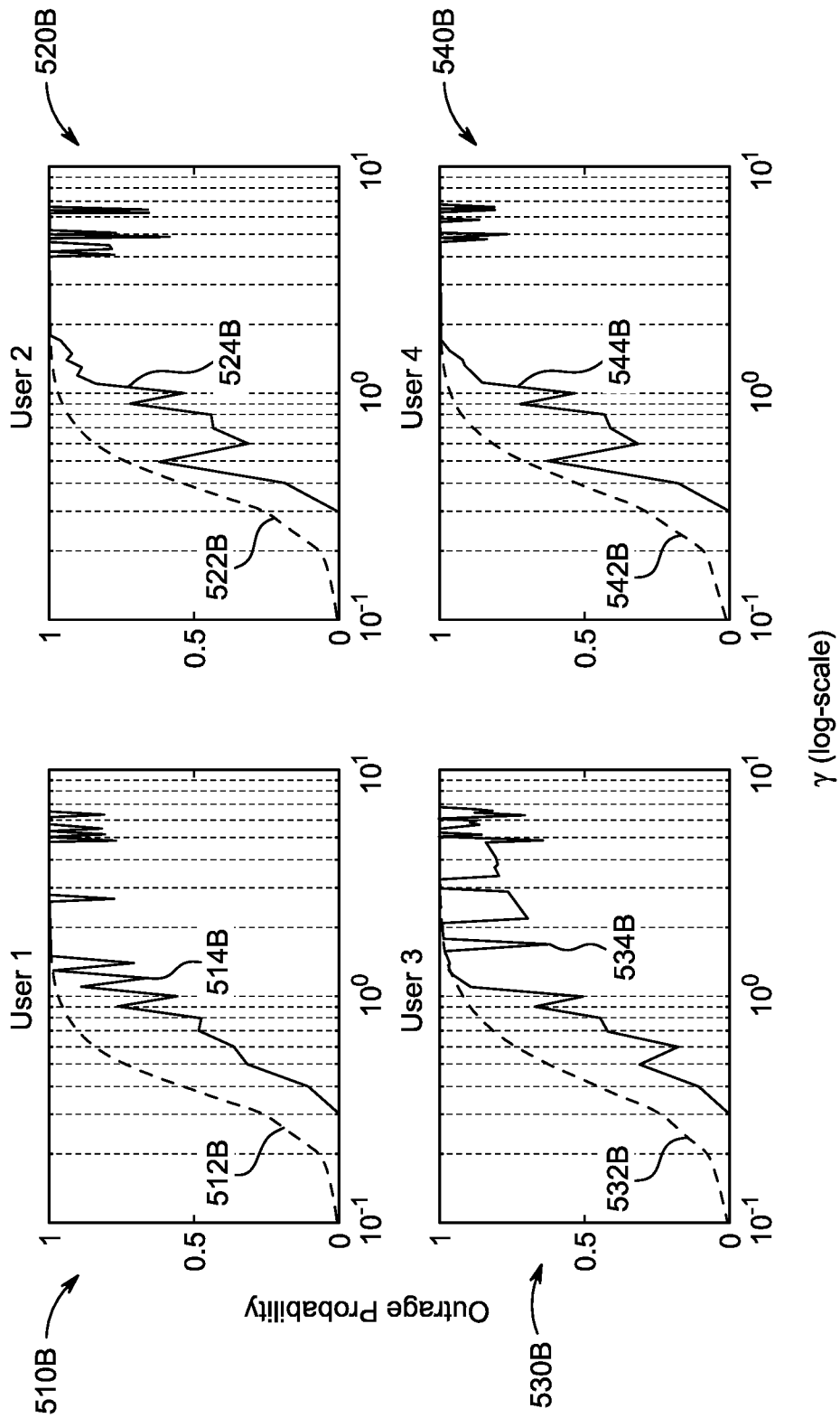
FIG. 5B are graphs comparing baseline and Pareto solutions using a selected algorithm, for values of outage probability versus SINR, according to certain embodiments.

FIG. 5B are graphs 510B-540B comparing baseline and Pareto solutions using a selected algorithm (active-set), according to certain embodiments. The local Pareto solutions of each user are shown in FIG. 5B as curves 514B, 524B, 534B, and 544B. These curves indicate that the performance as measured by values of outage probability versus SINK, is improved for each user as seen across each of the four graphs. In addition, all defined constraints are strictly met. Moreover, the beamformer design is implemented for base station/user pairs, Thus, the improved performance is not micro-managed to the individual user level.

Figure 6A:
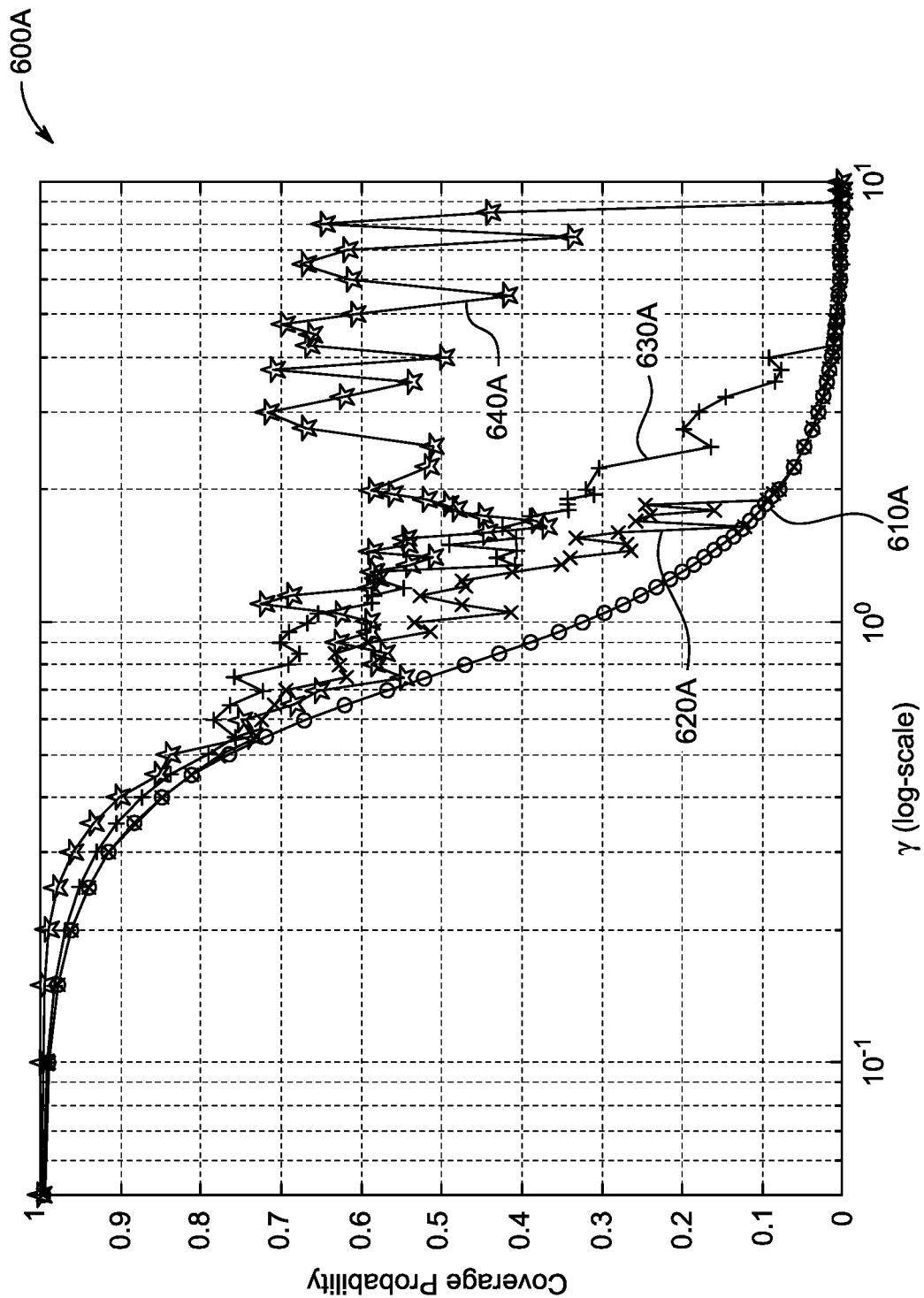
FIG. 6A is a graph comparing coverage probability versus SINR when using the system of FIG. 1 and various algorithms, according to certain embodiments.
Figure 6B:
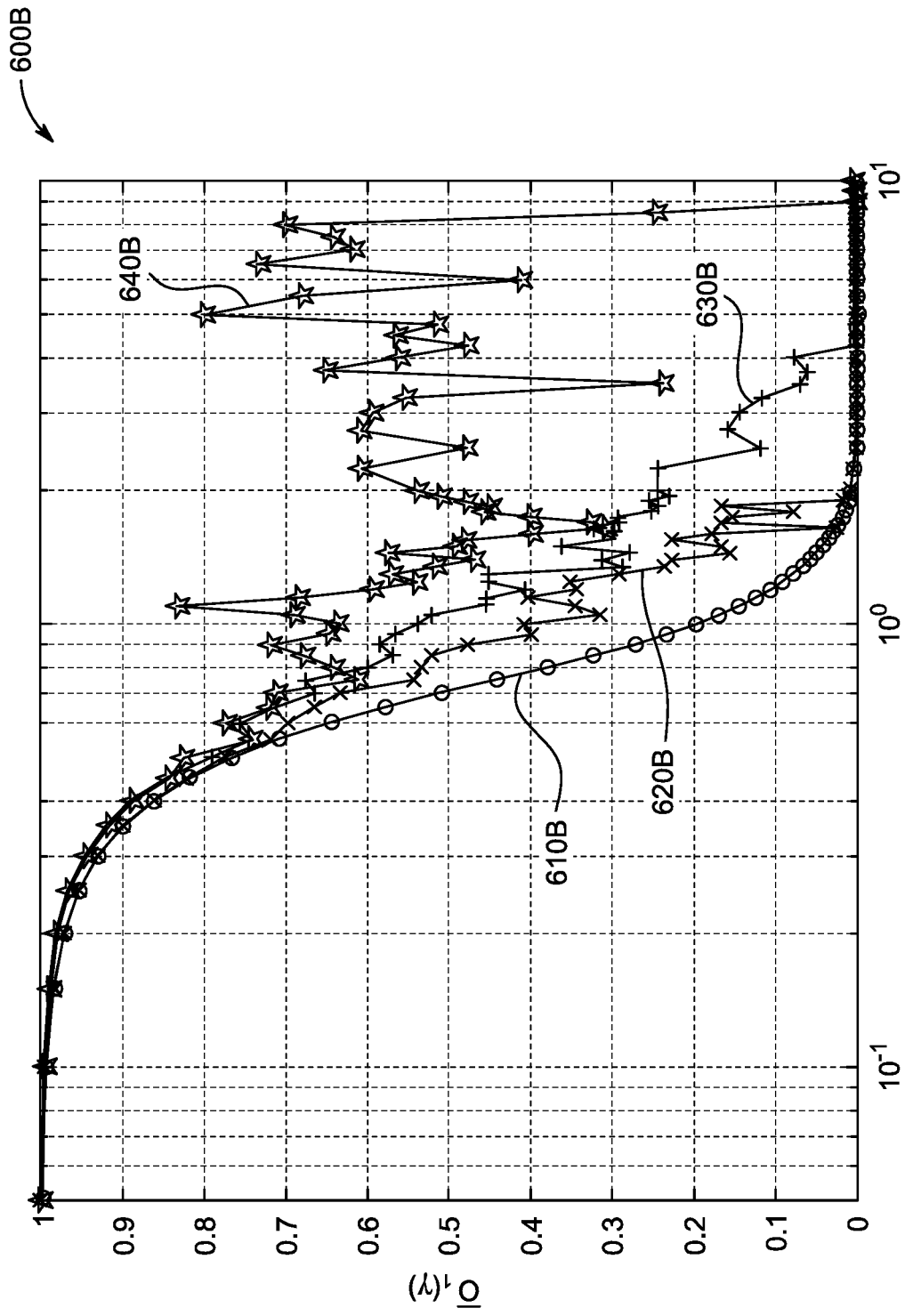
FIG. 6B is a graph of local Pareto solutions for a first user, according to certain embodiments.

FIG. 6A is a graph 600A comparing coverage probability versus SINR when using various algorithms, according to certain embodiments. FIG. 6B is a graph 600B of local Pareto solutions for a first user, according to certain embodiments. Each graph compares the results using an active-set technique with one of either the LSAB (620A/620B), OSAB (630A/630B), or JOLSAB (640A/640B) algorithm. Simulations are compared to a coverage probability without optimization (curves 610A and 610B) as well. The maximum number of iterations and function evaluations for each simulation were selected as 1000 and 20000, respectively. As seen from both graph 600A and 600B, JOLSAB is more effective systemically (depicted in 600A), as well as for the individual users (shown in 600B).

Figure 7:
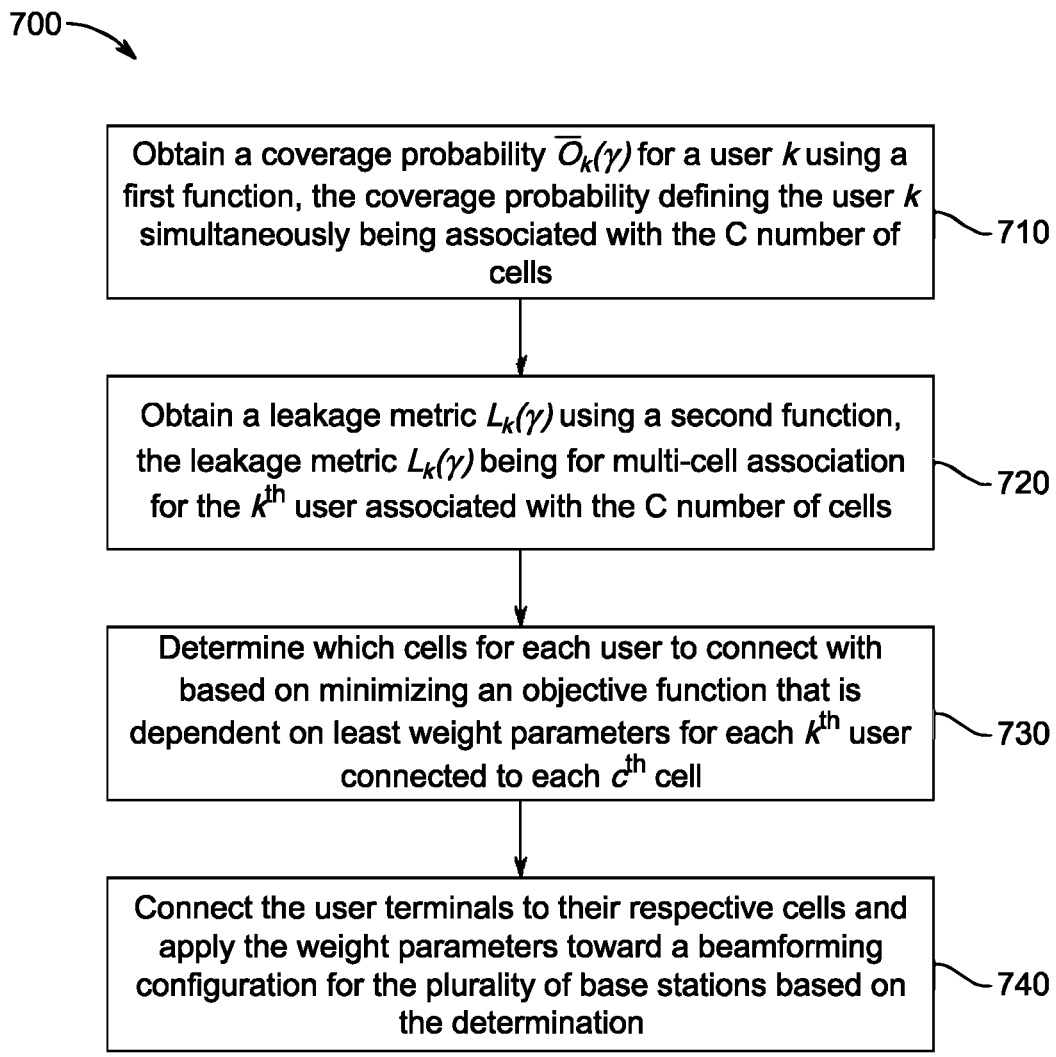
FIG. 7 is a flowchart representing a method of optimizing multi-cell association in a downlink multi-user, multiple-input, multiple-output (MU-MIMO) system, according to certain embodiments.

Returning to the individual methods of designing and implementing beamformers according to certain embodiments of the present application, FIG. 7 is a flowchart representing a generic method 700 of optimizing multi-cell association in a downlink MU-MIMO system. Method 700 includes a plurality of base stations corresponding to C number of cells which serve K user terminals. Each user terminal in method 700 can connect with at least two cells.

At a step 710, a coverage probability $\overline{O}_k(\gamma)$ for a user k is obtained using a first function. The coverage probability obtained at step 710 defines the user k simultaneously being associated with the C number of cells. At a step 720, a leakage metric $L_k(\gamma)$ is obtained using a second function. The leakage metric $L_k(\gamma)$ is related to multi-cell association for the $k^{th}$ user associated with the C number of cells.

Method 700 continues at a step 730 by determining with which cells each user will connect. The determination is based on minimizing an objective function. The objective function is dependent on least weight parameters, such as those found in steps 710 and 720, for each $k^{th}$ user connected to each $c^{th}$ cell. At a step 740, the user terminals are connected to their respective cells and the weight parameters toward a beamforming configuration for the plurality of base stations are applied based on the determination at step 730.

Figure 8:
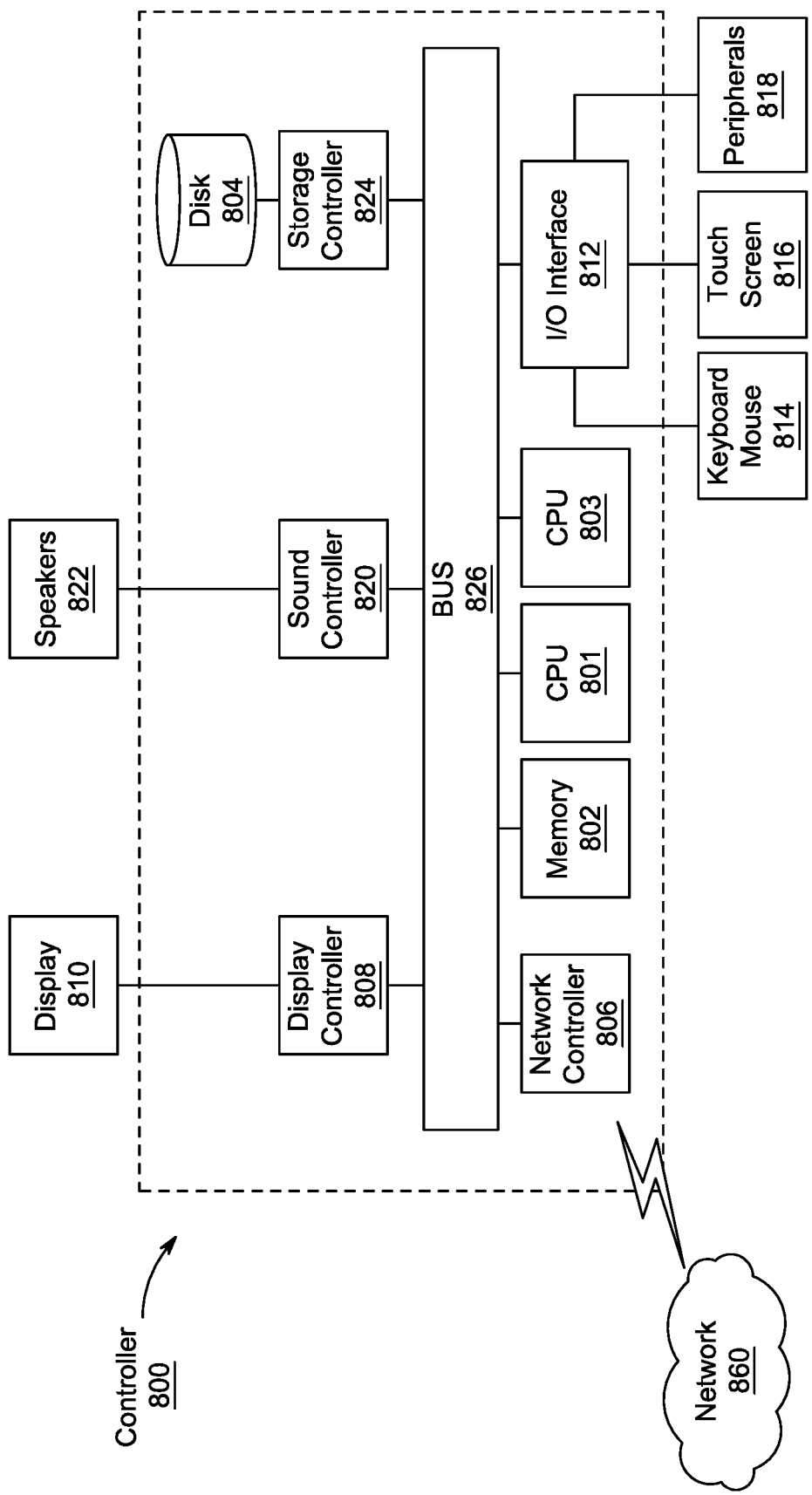
FIG. 8 is an illustration of a non-limiting example of details of computing hardware used in the computing system, according to certain embodiments.

Next, further details of the hardware description of the computing environment of the MU-MIMO network according to exemplary embodiments is described with reference to FIG. 8. In FIG. 8, a controller 800 is described and is representative of a computing device as described above with respect to the base station. Controller 800 is a computing device which includes a CPU 801 that performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the relevant art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN sub-networks. The network 860 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general-purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
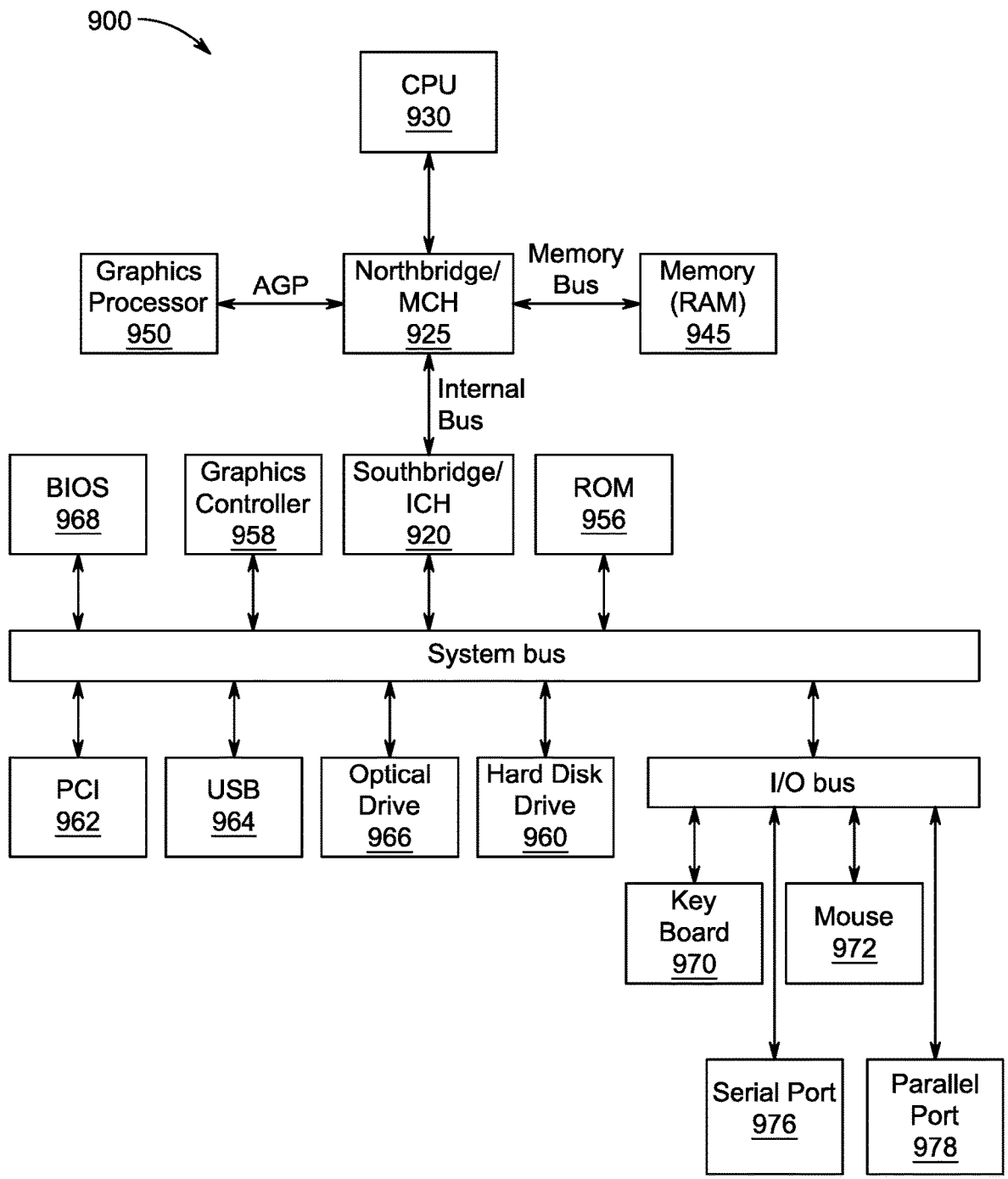
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
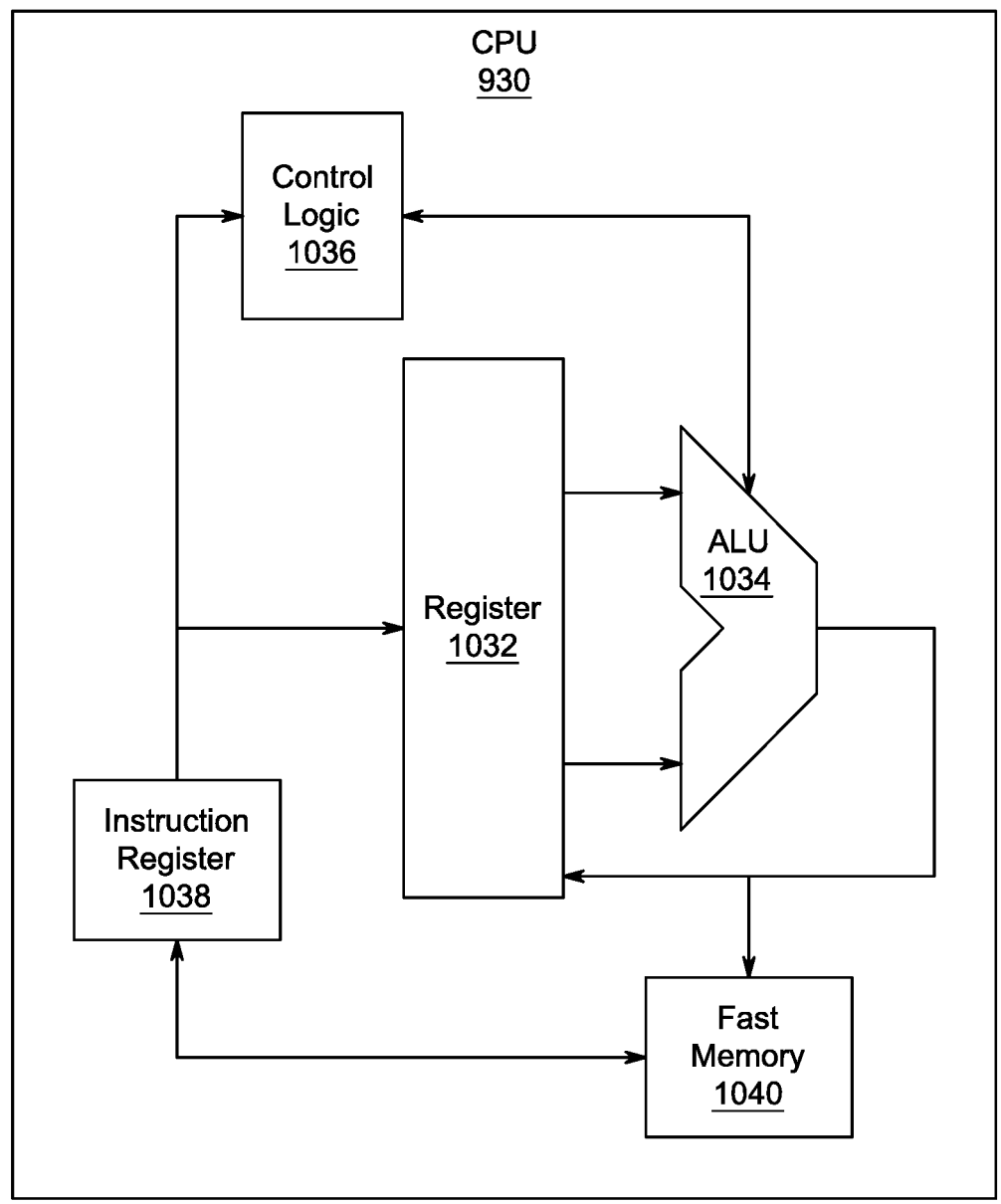
FIG. 10 is an exemplary schematic diagram of a processor used with the computing system, according to certain embodiments.

For example, FIG. 10 shows one implementation of CPU 930. In one implementation, the instruction register 1038 retrieves instructions from the fast memory 1040. At least one or more parts of these instructions are fetched from the instruction register 1038 by the control logic 1236 and interpreted according to the instruction set architecture of the CPU 930. Parts of the instructions can also be directed to the register 1032. In one implementation, the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, and/or a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 988 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 11:
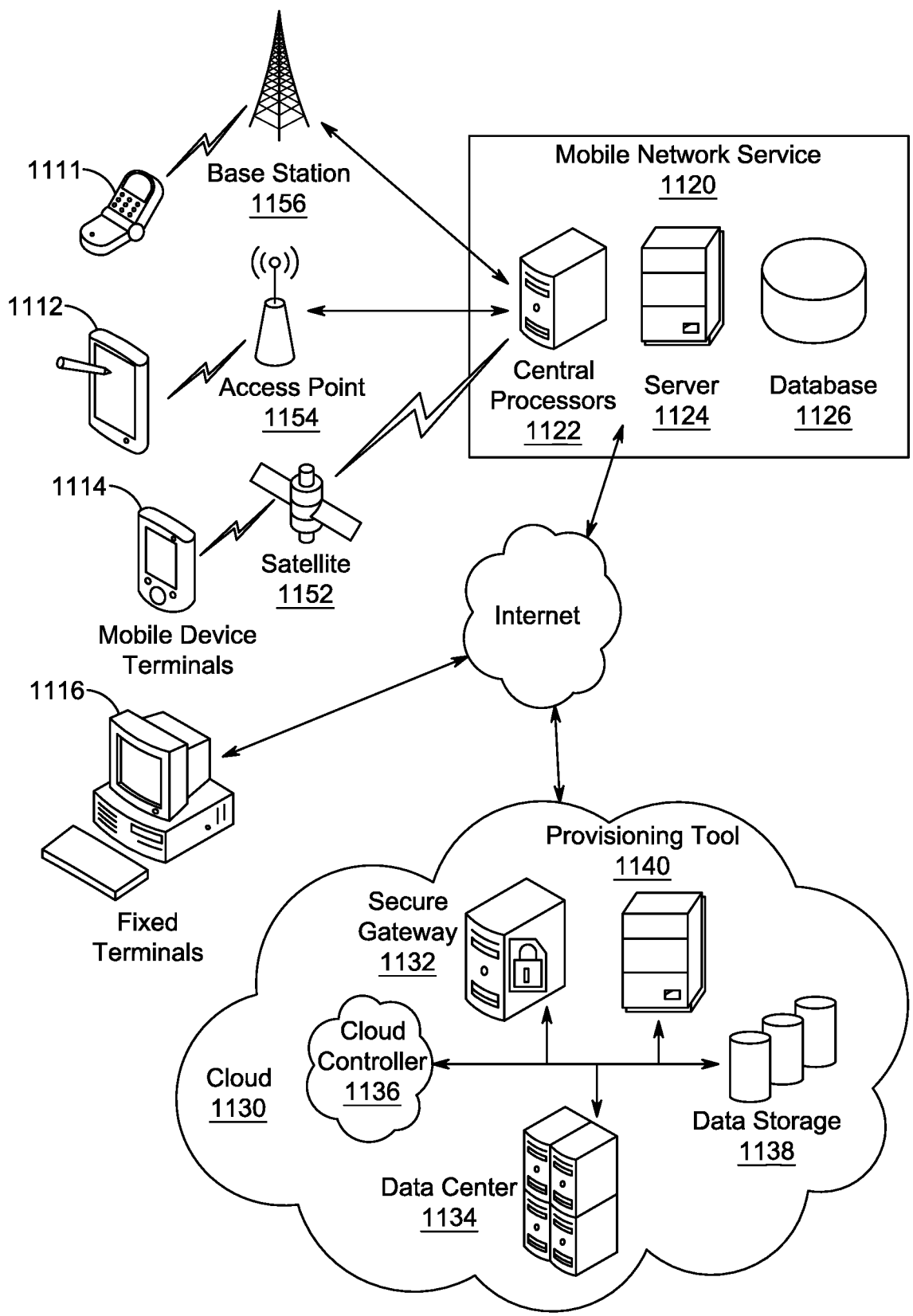
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 11, in addition to various human interface and communication devices (e.g., cell phones 1111, personal digital assistants (PDAs) 1112, smart phones or mobile device terminals 1114, display monitors or fixed terminals 1116, tablets not shown or numbered). The network may be a private network, such as a LAN or WAN, or may be a public network, such as the Internet. Access may be through a satellite 1152, an access point 1154, or base station 1156, to a mobile network service 1120. The mobile network service 1120 can include central processor(s) 1122, server(s) 1124, or database(s) 1126. Input to the system may be received via direct user input and received remotely either in real-time or as a batch process. Back-end processing may be enabled by cloud services 1130, with the aid of one or more of secure gateway 1132, data center 1134, cloud controller 1136, data storage 1138, and/or provisioning tool 1140. Additionally, some implementations may be performed on modules or hardware not identical to those described. Accordingly, other implementations are within the scope that may be claimed.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of optimizing multi-cell association in a downlink multi-user (MU) multiple-input and multiple-output (MIMO) system that includes a plurality of base stations corresponding to c number of cells which serve k user terminals, where each user terminal connects with at least two cells, the method comprising:
   determining which cells for each user to connect with based on minimizing an objective function that is dependent on least weight parameters for each $k^{th}$ user connected to each $c^{th}$ cell; and
   connecting the user terminals to their respective cells and applying the weight parameters toward a beamforming configuration for the plurality of base stations based on the determination.

2. The method according to claim 1, wherein the objective function is based on
   obtaining a coverage probability $\overline{O}_k(\gamma)$ for a user k using a first function, the coverage probability defining the user k simultaneously being associated with the C number of cells; and
   obtaining a leakage metric $L_k(\gamma)$ using a second function, the leakage metric $L_k(\gamma)$ being for multi-cell association for the kth user associated with the C number of cells.

3. The method according to claim 2, wherein the first function is $\overline{O}_k$ $$\overline{O}_k(\gamma) = 1 - \prod_{c=1}^{C} F_{c;k}(\gamma_c),$$

$$F_{c;k}(\gamma_c) \text{ is } F_{c;k}(\gamma_c) = 1 - \sum_{n=1}^{N_+} \frac{\lambda_{c;n}^{N-1}}{\prod_{i=1, i\neq n}^{N}(\lambda_{c;n} - \lambda_{c;i})} e^{-\frac{\sigma_{c;k}^2 \gamma_c}{\lambda_{c;n}}}, \lambda_{c;n}$$

is $n^{th}$ eigenvalue of a Hermitian matrix, and $\gamma_c$ is a threshold level of the $c^{th}$ cell.

4. The method of claim 3, wherein the second function is $L_k(\gamma) = \prod_{c=1}^{C} L_{c;k}(\gamma_c)$, $\gamma_c$ being a threshold level of the $c^{th}$ cell.

5. The method of claim 4, wherein the objective function is $$J_{JOLSAB} = \sum_{k=1}^{K} (\zeta_{1,k} O_k(w_{c;k}, \gamma_c) + \zeta_{2,k} L_k(w_{c;k}, \gamma_c)),$$

where $\zeta_{1,k}$ and $\zeta_{2,k}$ represent adaptive weight vectors, and $w_{c;k}$ is a weight vector.

6. The method of claim 5, wherein the constraints applied to the objective function are as follows:

$$\|w_{c;k}\|_2^2 = 1; \quad \forall\, c, k,$$

$$\sum_{k=1}^{K} (\zeta_{1,k} + \zeta_{2,k}) = 1$$

$$F_{c;k}^{t+1}(w_{c;k}, \gamma_c) \le F_{c;k}^{t}(w_{c;k}, \gamma_c); \quad \forall\, c, k.$$

7. The method of claim 4, wherein the objection function is $$J_{ODAB} = \sum_{c=1}^{C} \sum_{k=1,}^{K} \zeta_{c;k} F_{c;k}(w_{c;k}, \gamma_c)$$

where $\zeta_{c;k}$ represents weight parameters pertinent for the kth user connected to the $c^{th}$ cell.

8. The method of claim 7, wherein the constraints on applying the objective function are as follows:

$$\|w_{c;k}\|_2^2 = 1; \quad \forall\, c, k,$$

$$\sum_{c=1}^{C} \sum_{k=1}^{K} \zeta_{c;k} = 1,$$

$$F_{c;k}^{t+1}(w_{c;k}, \gamma_c) \le F_{c;k}^{t}(w_{c;k}, \gamma_c); \quad \forall\, c, k.$$

9. The method of claim 4, wherein the objection function is $$J_{OSAB} = \sum_{k=1}^{K} \zeta_k O_k(w_{c;k} \gamma_c)$$

where represents an adaptive weight vector, and $w_{c;k}$ is a weight vector.

10. The method of claim 9, wherein the constraints on applying the objective function are as follows:

$$\|w_{c;k}\|_2^2 = 1; \quad \forall\, c, k,$$

$$\sum_{k=1}^{K} \zeta_k = 1$$

$$F_{c;k}^{t+1}(w_{c;k}, \gamma_c) \le F_{c;k}^{t}(w_{c;k}, \gamma_c); \quad \forall\, c, k.$$

11. The method of claim 4, wherein the objection function is $$J_{LSAB} = \sum_{k=1}^{K} \zeta_k L_k(w_{c;k} \gamma_c)$$

where $\zeta_k$ represents an adaptive weight vector, and $w_{c;k}$ is a weight vector.

12. The method of claim 11, wherein the constraints on applying the objective function are as follows:

$$\|w_{c;k}\|_2^2 = 1; \quad \forall\, c, k,$$

$$\sum_{k=1}^{K} \zeta_k = 1$$

$$F_{c;k}^{t+1}(w_{c;k}, \gamma_c) \le F_{c;k}^{t}(w_{c;k}, \gamma_c); \quad \forall\, c, k.$$

13. A device for optimizing multi-cell association in a downlink multi-user (MU) multiple-input and multiple-output (MIMO) system that includes a plurality of base stations corresponding to c number of cells which serve k user terminals, where each user terminal connects with at least two cells, the system comprising:
processing circuitry configured to
determine which cells for each user to connect with based on minimizing an objective function that is dependent on least weight parameters for each kth user connected to each $c^{th}$ cell; and
connect the user terminals to their respective cells and applying the weight parameters toward a beamforming configuration for the plurality of base stations based on the determination.

14. The device according to claim 13, wherein the objective function is based on
obtaining a coverage probability $\overline{O}_k(\gamma)$ for a user k using a first function, the coverage probability defining the user k simultaneously being associated with the C number of cells; and
obtaining a leakage metric $L_k(\gamma)$ using a second function, the leakage metric $L_k(\gamma)$ being for multi-cell association for the kth user associated with the C number of cells.

15. The device according to claim 14, wherein the first function is $$\overline{O}_k(\gamma) = 1 - \prod_{c=1}^{C} F_{c;k}(\gamma_c),$$

$$F_{c;k}(\gamma_c) \text{ is } F_{c;k}(\gamma_c) = 1 - \sum_{n=1}^{N_+} \frac{\lambda_{c;n}^{N-1}}{\prod_{i=1,i\ne n}^{N}(\lambda_{c;n}-\lambda_{c;i})} e^{\frac{\sigma_{c;k}^2 \gamma_c}{\lambda_{c;n}}}, \lambda_{c;n} \text{ is}$$

$n^{th}$ eigenvalue of a Hermitian matrix, and $\gamma_c$ is a threshold level of the $c^{th}$ cell.

16. The device of claim 15, wherein the second function is $L_k(\gamma) = \prod_{c=1}^{C} L_{c;k}(\gamma_c)$, $\gamma_c$ being a threshold level of the $c^{th}$ cell.

17. The device of claim 16, wherein the objective function is $$J_{JOLSAB} = \sum_{k=1}^{K} (\zeta_{1,k} O_k(w_{c;k}, \gamma_c) + \zeta_{2,k} L_k(w_{c;k}, \gamma_c)),$$

where $\zeta_{1,k}$ and $\zeta_{2,k}$ represent adaptive weight vectors, and $w_{c;k}$ is a weight vector.

18. The device of claim 17, wherein the constraints applied to the objective function are as follows:

$$\|w_{c;k}\|_2^2 = 1; \quad \forall c, k,$$

$$\sum_{k=1}^{K} (\zeta_{1,k} + \zeta_{2,k}) = 1$$

$$F_{c;k}^{t+1}(w_{c;k}, \gamma_c) \le F_{c;k}^{t}(w_{c;k}, \gamma_c); \quad \forall c, k.$$

19. A non-transitory computer readable medium that stores a program that when executed by a device for optimizing multi-cell association in a downlink multi-user (MU) multiple-input and multiple-output (MIMO) system that includes a plurality of base stations corresponding to c number of cells which serve k user terminals, where each user terminal connects with at least two cells, causes the device to perform a method comprising:
  determining which cells for each user to connect with based on minimizing an objective function that is dependent on least weight parameters for each kth user connected to each cth cell; and
  connecting the user terminals to their respective cells and applying the weight parameters toward a beamforming configuration for the plurality of base stations based on the determination.

* * * * *